United States Patent
Jang et al.

(10) Patent No.: US 10,681,061 B2
(45) Date of Patent: Jun. 9, 2020

(54) FEEDBACK-BASED PRIORITIZED COGNITIVE ANALYSIS

(71) Applicant: International Business Machines Corporation, Armonk, NY (US)

(72) Inventors: Jiyong Jang, White Plains, NY (US); Dhilung Hang Kirat, White Plains, NY (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 15/623,062

(22) Filed: Jun. 14, 2017

(65) Prior Publication Data

US 2018/0367549 A1  Dec. 20, 2018

(51) Int. Cl.
*H04L 29/06* (2006.01)
*G06N 5/04* (2006.01)
*G06N 20/00* (2019.01)
*G06F 16/901* (2019.01)
(Continued)

(52) U.S. Cl.
CPC ...... *H04L 63/1416* (2013.01); *G06F 16/9024* (2019.01); *G06N 5/003* (2013.01); *G06N 5/022* (2013.01); *G06N 5/04* (2013.01); *G06N 20/00* (2019.01); *H04L 63/1425* (2013.01); *H04L 63/1433* (2013.01); *H04L 63/1441* (2013.01)

(58) Field of Classification Search
None
See application file for complete search history.

(56) References Cited

U.S. PATENT DOCUMENTS

| 8,392,997 B2* | 3/2013 | Chen ............ G06F 21/577 726/25 |
| 9,292,695 B1* | 3/2016 | Bassett ............ G06F 21/577 |
| 9,516,053 B1 | 12/2016 | Coden et al. |

(Continued)

OTHER PUBLICATIONS

IPCOM000243925D, "Analytic Forecasting of Future Electronic Cyber Threats with Deep Learning and Coevolutionary Strategies," Oct. 28, 2015.

(Continued)

*Primary Examiner* — Christopher A Revak
(74) *Attorney, Agent, or Firm* — Jeffrey S. LaBaw; David H. Judson

(57) ABSTRACT

An automated method for processing security event data in association with a cybersecurity knowledge graph having nodes and edges. It begins by receiving from a security system (e.g., a SIEM) information representing an offense. An offense context graph is built. Thereafter, and to enhance the offense context graph, given nodes and edges of the knowledge graph are prioritized for traversal based on an encoding captured from a security analyst workflow. This prioritization is defined in a set of weights associated to the graph nodes and edges, and these weights may be derived using machine learning. The offense context graph is then refined by traversing the nodes and edges of the knowledge graph according to a prioritization tailored at least in part by the encoding. In addition to using security analyst workflow to augment generation of weights, preferably the machine learning system provides recommendations back to the security analysts to thereby influence their workflow.

22 Claims, 6 Drawing Sheets

(51) Int. Cl.
*G06N 5/02* (2006.01)
*G06N 5/00* (2006.01)

(56) References Cited

U.S. PATENT DOCUMENTS

| | | | |
|---|---|---|---|
| 2009/0099988 A1 | 4/2009 | Stokes et al. | |
| 2010/0058456 A1* | 3/2010 | Jajodia | G06F 21/552 |
| | | | 726/11 |
| 2010/0138925 A1* | 6/2010 | Barai | H04L 63/1433 |
| | | | 726/25 |
| 2010/0325412 A1* | 12/2010 | Norrman | G06F 21/577 |
| | | | 713/100 |
| 2015/0172321 A1 | 6/2015 | Kirti et al. | |
| 2016/0205122 A1* | 7/2016 | Bassett | G06F 21/577 |
| | | | 726/23 |
| 2016/0364163 A1 | 12/2016 | Kamble | |
| 2017/0063912 A1 | 3/2017 | Muddu et al. | |
| 2018/0046928 A1* | 2/2018 | Jang | G06N 5/022 |
| 2018/0048661 A1* | 2/2018 | Bird | H04L 63/1416 |
| 2018/0048662 A1* | 2/2018 | Jang | H04L 63/1425 |
| 2018/0159876 A1* | 6/2018 | Park | G06F 16/9024 |
| 2019/0052663 A1* | 2/2019 | Lee | H04L 63/1433 |

OTHER PUBLICATIONS

Santos et al, IPCOM000248565D, "Adaptive Learning Model for Application-Based Trust and Risk Scoring Using Consistent Profile Creation," Dec. 19, 2016.

Kumar et al, IPCOM000239081D, "Machine Learning Based Predictive Model for Analyzing the Sentiments in Short Text," Oct. 10, 2014.

Stiborek et al, IPCOM000238197D, "Realistic Simulation of Network Behavior for Evaluation and Self-Adjustment of Intrusion Detection System," Aug. 7, 2014.

* cited by examiner

FEEDBACK-BASED PRIORITIZED COGNITIVE ANALYSIS

BACKGROUND

Technical Field

This disclosure relates generally to cybersecurity offense analytics.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® SIEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact. While SIEM-based approaches provide significant advantages, the rules are either hard coded or parameterized with a threat feed with concrete indicators of compromise (IoCs). Thus, typically these solutions are able to detect only known threats, but for unknown threats, e.g., detected by means of a behavior based rule, are unable to identify root cause and assist the security analyst. Moreover, these systems can present implementation challenges, as they often rely on manual curation of any semi-structured and unstructured threat feeds, i.e., natural language text, by means of security professionals reading threat advisories and extracting IoCs.

Security Operations Center (SOC) analysts who use such systems are confronted with a large number of offenses every day. The majority of their time is spent to understand and analyze these offenses, confirm their validity, find related information, and attempt to find appropriate actions to resolve them. Typically, SOC analysts attempt to find relevant cybersecurity intelligence reports and/or vulnerability reports for the target offenses from various data sources. To this end, mostly they use web search engines to query and manually browse threat and security intelligence Internet services. Given the widely-disparate information sources, an analyst often is faced with many, often conflicting, data sources and hypotheses to read and process to draw a conclusion.

To address this need, it is known to provide cybersecurity offense analytics using a cognitive methodology to automatically analyze and enrich an offence on behalf of a security analyst by collecting relevant contextual data. The basic approach involves processing security event data in association with a cybersecurity knowledge graph ("KG") that is derived one or more data sources and includes a set of nodes, and a set of edges. In one approach, an automated method begins upon receipt of information representing an offense from a security system (e.g., a SIEM). Based on the offense type, context data about the offense is extracted, and an initial offense context graph is built. The initial offense context graph also comprises nodes and edges. At least one of the set of nodes in the offense context graph is a root node representing an offending entity that is determined as a cause of the offense. The initial offense context graph also includes one or more activity nodes connected to the root node either directly or through one or more other nodes of the set, wherein at least one activity node has associated therewith data representing an observable. The root node and its one or more activity nodes associated therewith (and the observables) represent a context for the offense. The knowledge graph and potentially other data sources are then examined to further refine the initial offense context graph.

In particular, preferably the knowledge graph is explored by locating the observables (identified in the initial offense graph) in the knowledge graph. Based on the located observables and their connections being associated with one or more known malicious entities as represented in the knowledge graph, one or more subgraphs of the knowledge graph are then generated. A subgraph typically has a hypothesis (about the offense) associated therewith. Using a hypothesis, the security system (or other data source) is then queried to attempt to obtain one or more additional observables (i.e. evidence) supporting the hypothesis. Then, a refined offense context graph is created, preferably by merging the initial offense context graph, the one or more sub-graphs derived from the knowledge graph exploration, and the additional observables mined from the one or more hypotheses. The resulting refined offense context graph is then provided (e.g., to a SOC analyst) for further analysis.

An offense context graph that has been refined in this manner reveals which parts of the graph might best be prioritized for further analysis. The approach simplifies the further analysis and corrective tasks that must then be undertaken to address the root cause of the offense. While the above-described approach provides significant advantages, one of the major challenges in enriching or expanding an offense context graph by exploring a knowledge graph is to assign relevance weight to nodes and edges. This is important, because carefully-chosen weighting allows further and more nuanced decision-making regarding what nodes and edges should be explored, to identify key supporting evidence, and to avoid information overload.

The technique of this disclosure addresses this need.

BRIEF SUMMARY

An automated method for processing security event data in association with a cybersecurity knowledge graph having nodes and edges. It begins by receiving from a security system (e.g., a SIEM) information representing an offense. An offense context graph is built. Thereafter, and to enhance the offense context graph, given nodes and edges of the knowledge graph are prioritized for traversal based on an encoding captured from a security analyst workflow. This prioritization is defined in a set of weights associated to the graph nodes and edges, and these weights may be derived using machine learning. The offense context graph is then refined by traversing the nodes and edges of the knowledge graph according to a prioritization tailored at least in part by the encoding. In addition to using security analyst workflow to augment generation of weights, preferably the machine learning system provides recommendations back to the security analysts (e.g., about which knowledge graph paths might be useful to investigate) to thereby influence their workflow.

The approach herein thus provides for two-way (bilateral) feedback between analysts and an cognitive offense analytics platform. The analysts' feedback (as expressed, for example, in sets of encoded domain knowledge) helps a learning system in the platform tune weighting and preferences of nodes, edges and graph traversal depths with respect to an automatic (machine-based) investigation (typically of an offense context graph). At the same time, automatic investigation by the learning system also suggests or recommends to the analysts which nodes or edges to investigate, e.g., guided search. This looping process preferably operates continuously to facilitate cognitive analysis using prioritized nodes and edges of a graph.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN
ILLUSTRATIVE EMBODIMENT

Figure 1:
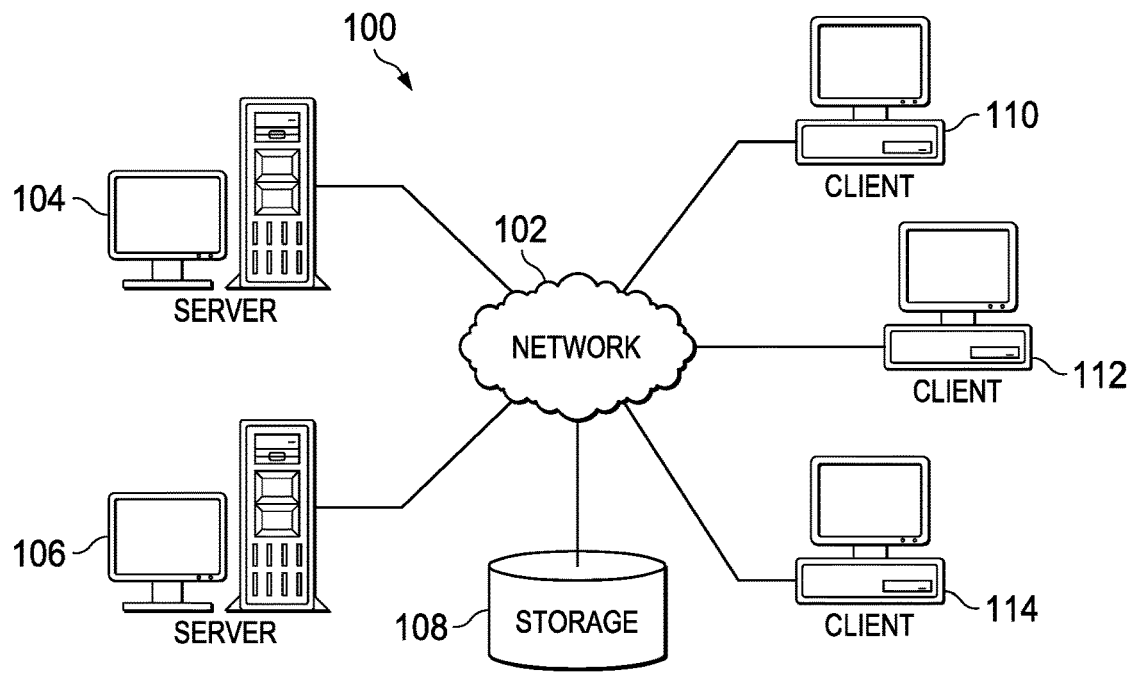
FIG. 1 depicts an exemplary block diagram of a distributed data processing environment in which exemplary aspects of the illustrative embodiments may be implemented.
Figure 2:
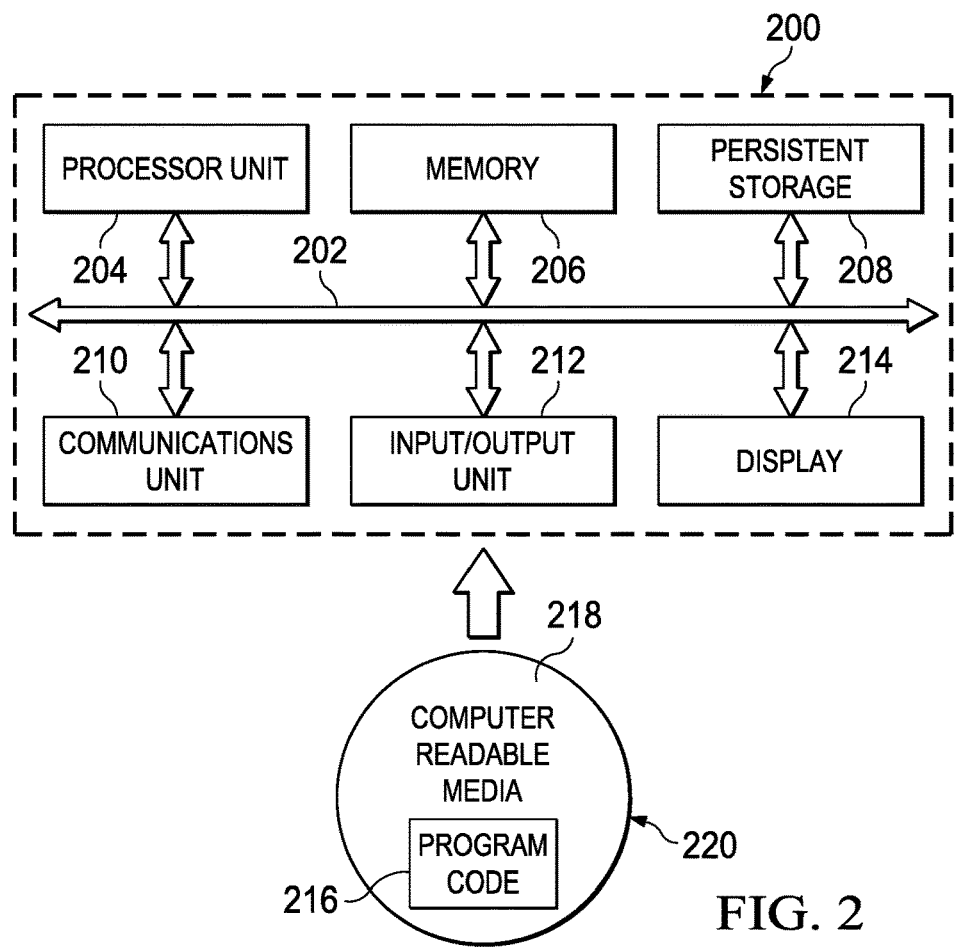
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
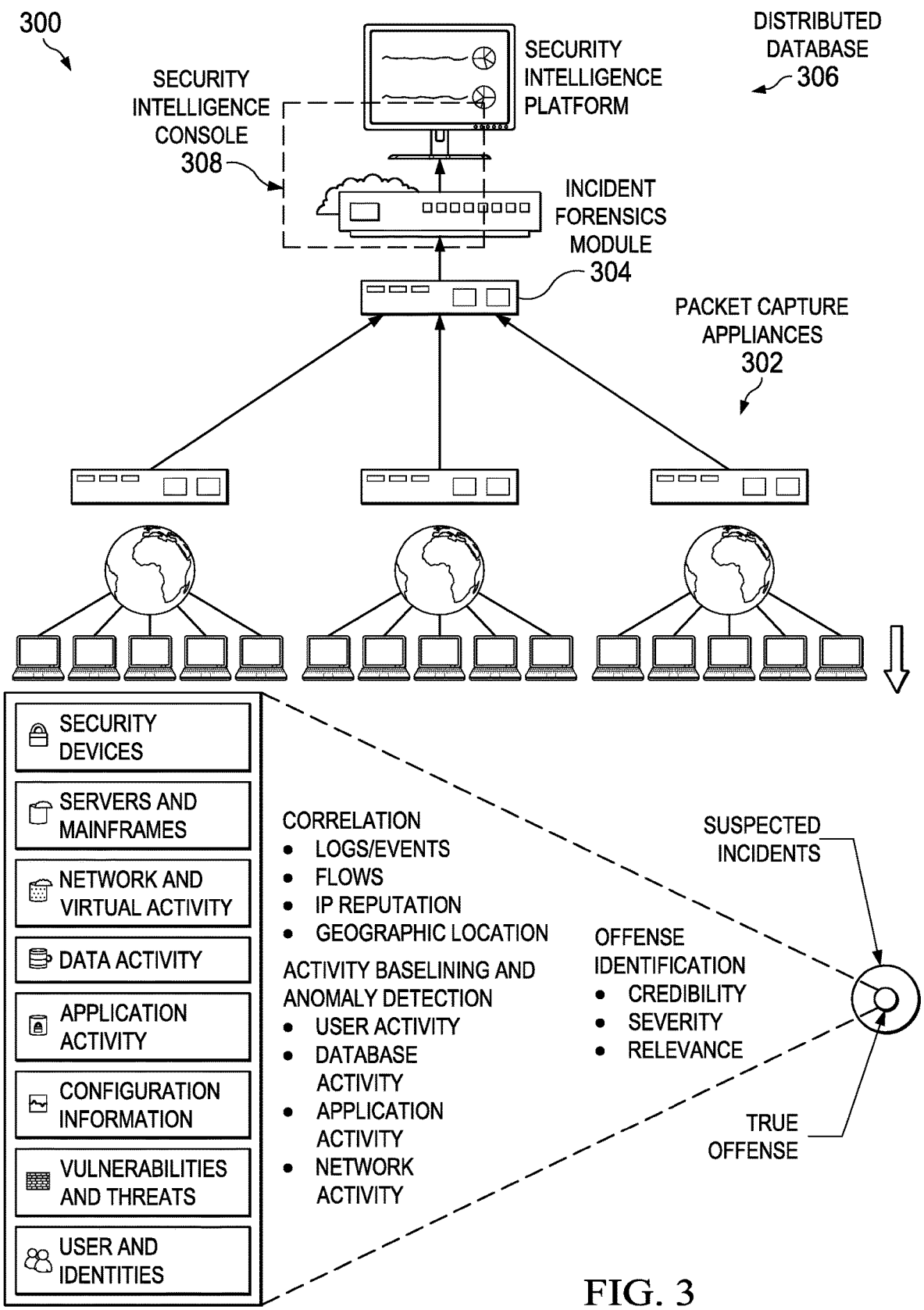
FIG. 3 illustrates a security intelligence platform in which the techniques of this disclosure may be practiced.

A representative security intelligence platform in which the techniques of this disclosure may be practiced is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, and as noted above, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar SIEM installation, the system such as shown in FIG. 3, is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Cognitive Offense Analysis Using Contextual Data and Knowledge Graphs

The following provides additional background concerning cognitive offense analytics.

In one embodiment, security event data is being processed in association with a cybersecurity knowledge graph ("KG"). The cybersecurity knowledge graph is derived one or more data sources and includes a set of nodes, and a set of edges. In one embodiment, processing proceeds as follows using a method. Preferably, the method is automated and begins upon receipt of information from a security system (e.g., a SIEM) representing an offense. Based on the offense type, context data about the offense is extracted, and an initial offense context graph is built. The initial offense context graph typically comprises a set of nodes, and a set of edges, with an edge representing a relationship between a pair of nodes in the set. At least one of the set of nodes in the offense context graph is a root node representing an offending entity that is determined as a cause of the offense. The initial offense context graph also includes one or more activity nodes connected to the root node either directly or through one or more other nodes of the set, wherein at least one activity node has associated therewith data representing an observable. The root node and its one or more activity nodes associated therewith (and the observables) represent a context for the offense. According to the method, the knowledge graph and potentially other data sources are then examined to further refine the initial offense context graph.

In particular, preferably the knowledge graph is explored by locating the observables (identified in the initial offense graph) in the knowledge graph. Based on the located observables and their connections being associated with one or more known malicious entities as represented in the knowledge graph, one or more subgraphs of the knowledge graph are then generated. A subgraph typically has a hypothesis (about the offense) associated therewith. Using a hypothesis, the security system (or other data source) is then queried to attempt to obtain one or more additional observables (i.e. evidence) supporting the hypothesis. Then, a refined offense context graph is created, preferably by merging the initial offense context graph, the one or more sub-graphs derived from the knowledge graph exploration, and the additional observables mined from the one or more hypotheses. The resulting refined offense context graph is then provided (e.g., to a SOC analyst) for further analysis.

An offense context graph that has been refined in this manner, namely, by incorporating one or more subgraphs derived from the knowledge graph as well as additional observables mined from examining the subgraph hypotheses, provides for a refined graph that reveals potential causal relationships more readily, or otherwise provides information that reveals which parts of the graph might best be prioritized for further analysis. The approach thus greatly simplifies the further analysis and corrective tasks that must then be undertaken to address the root cause of the offense.

Figure 4:
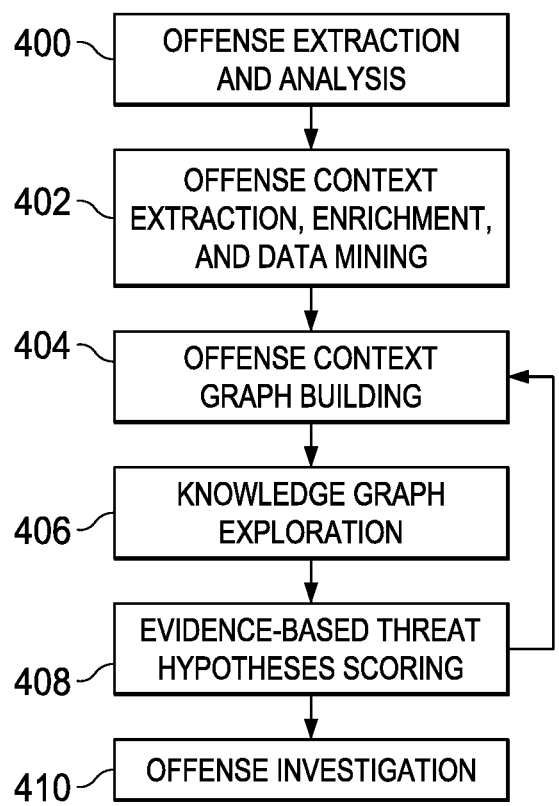
FIG. 4 depicts a high level process flow of a cognitive analysis technique in which the techniques of this disclosure may be used.

With reference now to FIG. 4, a high level process flow of the technique of this disclosure is provided The routine begins at step 400 with offense extraction and analysis. In this step, an offense is extracted from a SIEM system, such as IBM QRadar, for deep investigation. Typically, a detected offense may include many different entities, such as offense types, fired rules, user names, and involved indicators of compromise.

At step 402, the process continues with offense context extraction, enrichment and data mining. Here, offense context is extracted and enriched based on various information or factors such as, without limitation, time, an offense type, and a direction. This operation typically involves data mining around the offense to find potentially related events. The process then continues at step 404 to build an offense context graph, preferably with the offending entity as the center node and contextual information gradually connected to the center node and its children. Examples of contextual information can be represented by activity nodes in the graph. Typically, an activity comprises one or more observables, which are then connected to the respective activity, or directly to the center node.

The process then continues at step 406. In particular, at this step a knowledge graph is explored, preferably using a set of observables extracted from the offense context graph. This exploration step identifies related and relevant pieces of information or entities available from the knowledge graph. A primary goal in this operation is to find out how strongly the input observables are related to malicious entities in the knowledge graph. If the event related entities are strong malicious indicators, a hypothesis (represented by a subgraph in the knowledge graph) is generated. The process then continues at step 408. At this step, the resulting subgraph (generated in step 406) is mapped into the original offense context graph and scored. To reinforce the hypothesis (represented by the subgraph), additional evidence may be obtained (and built into the offense context graph) by querying local SIEM data for the presence of activities that are related to the hypothesis that is returned by the KG exploration in step 406. Additional findings as part of the hypothesis scoring may also be used to extend the offense context graph further and/or to trigger new knowledge graph explorations. Thus, step 408 represents an evidence-based scoring of the threat hypothesis.

The process then continues at step 410 with an offense investigation. At this point, the offense hypothesis includes the original offense IOCs (indicators of compromise), knowledge graph enrichment, evidence, and scores. The extended offense context graph is then provided to the SOC analyst (user) for offense investigation. The SOC user reviews the hypothesis that has been weighted in the manner described, and can then choose the right hypothesis that explains the given offense. There may be multiple hypotheses.

If additional or further exploration and more evidence are needed to make a decision, the SOC user can elect to nodes or edges in the offense context graph and repeat steps 406 and 408 as needed. This iteration is depicted in the drawing. This completes the high level process flow.

Figure 5:
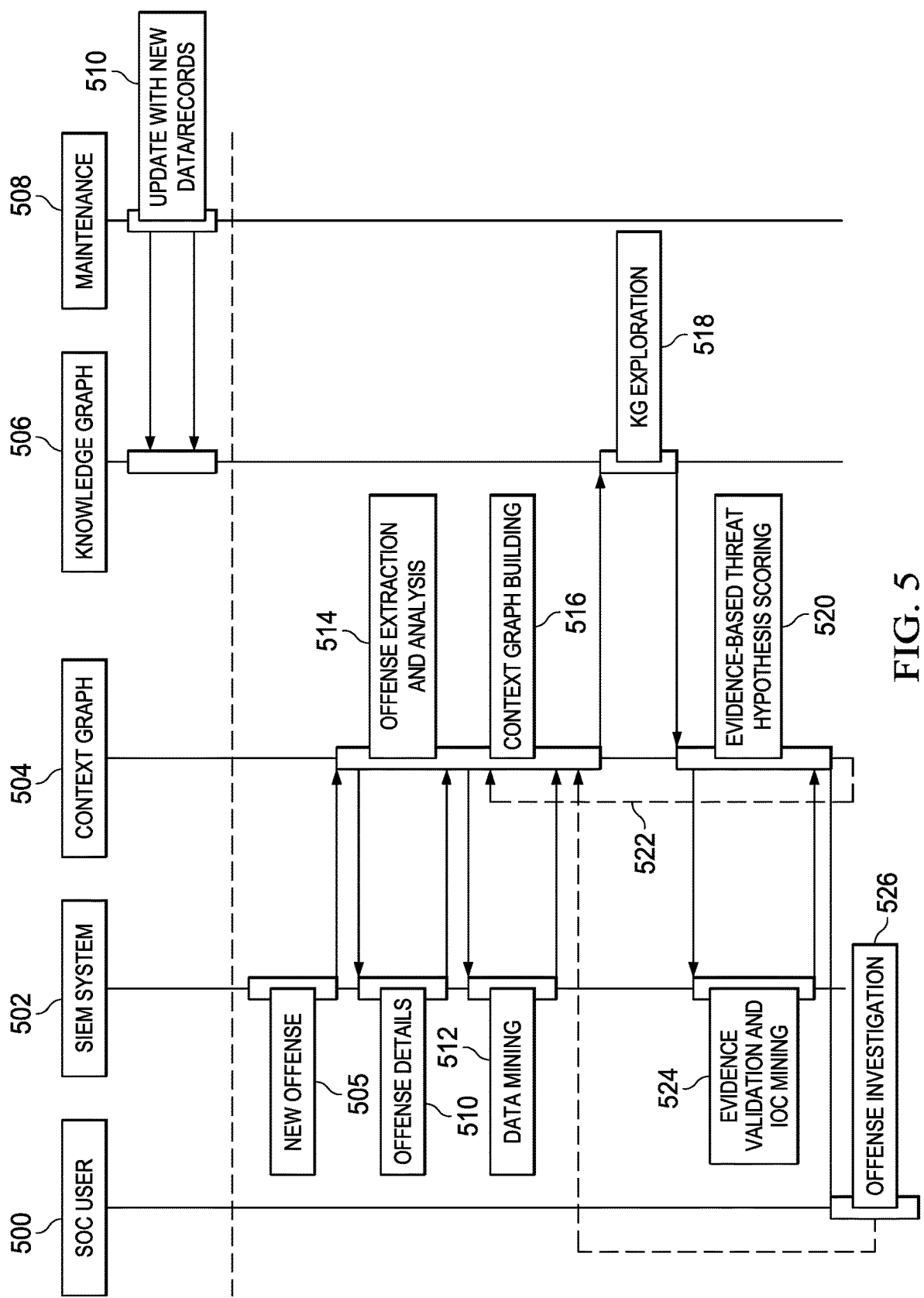
FIG. 5 depicts the cognitive analysis technique in additional detail.

FIG. 5 depicts a modeling diagram showing the various entities involved in the technique and their interactions. As depicted, these entities include the SOC user 500, the SIEM system 502, the (offense) context graph 504, a knowledge graph 506, and a maintenance entity 508. Viewing the interactions from top to bottom, the knowledge graph 506 may be updated with new data/records 510 periodically; this operation is shown as an off-line operation (above the dotted line). The remainder of the figure depicts the process flow referenced above. Thus, the new offense 505 is identified by the SIEM system 502 and used together with the offense details 510 and data mining 512 to generate the context graph 504 via the offense extraction and analysis 514 and context graph building 516 operations. Once built, the knowledge graph 506 is explored 518 to identify one or more subgraphs. The evidence-based threat hypothesis scoring uses the subgraphs at operation 520, and the process may iterate (operation 522) as previously described. After evidence validation and IOC mining 524, the offense investigation 526 is then carried out, typically by the SOC user 500.

Figure 6:
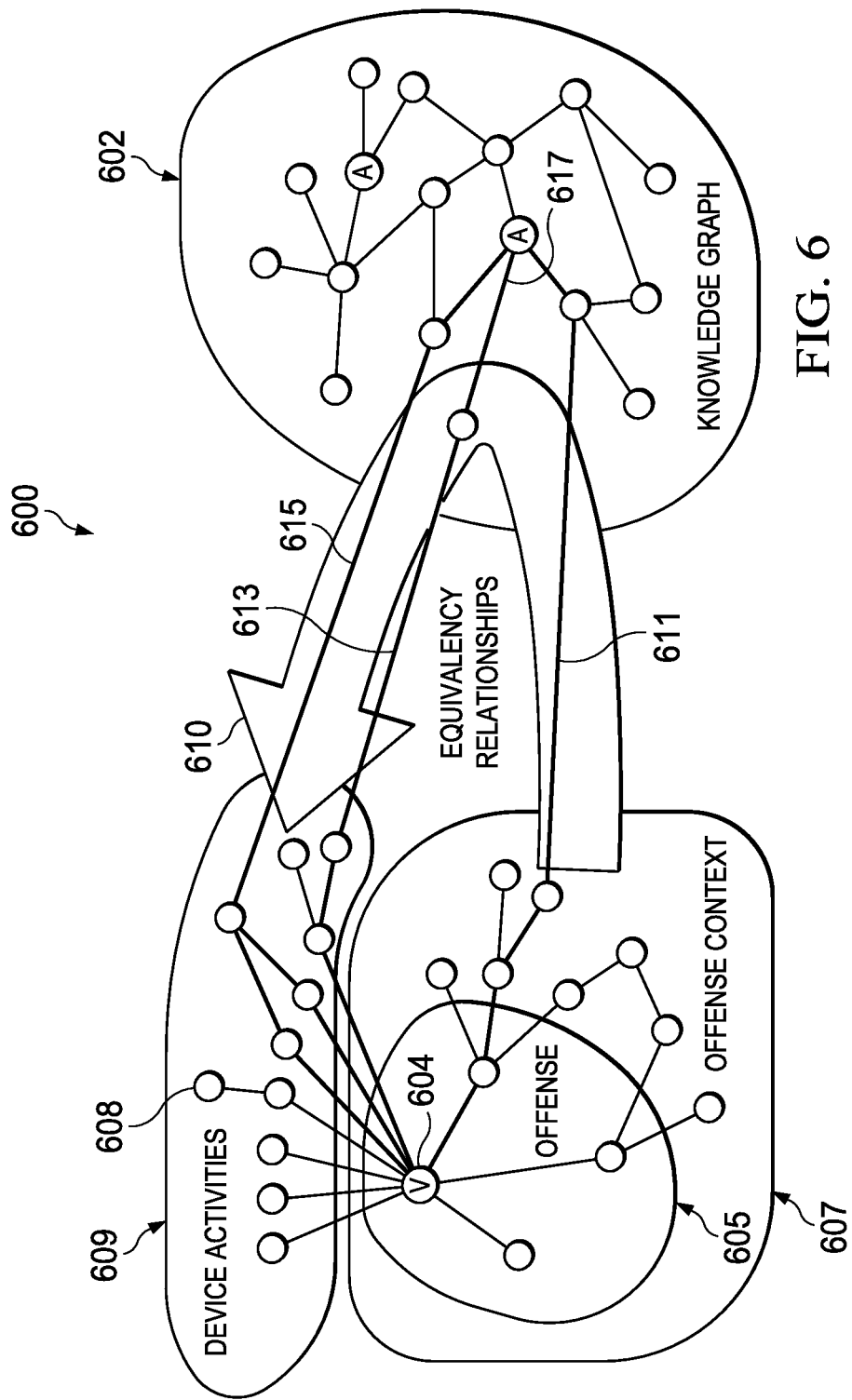
FIG. 6 depicts how an offense context graph is augmented using a security knowledge graph.

FIG. 6 depicts the offense context graph 600 augmented by the knowledge graph 602. In general, the offense context graph 600 depicts local kinetics, e.g., events and intelligence related to an offense, e.g., SIEM offense data, log events and flows, and such information preferably is augmented from the information derived from the knowledge graph 602. In this example embodiment, the knowledge graph is global in nature and scope, as it preferably depicts external cyber security and threat intelligence, cyber security concepts, and the like. Typically, and as will be described in more detail below according to this disclosure, the knowledge graph is informed by combining multiple structured and unstructured data sources. As shown, the offense context graph is centered around a root node 604 that has child nodes 606 within the "offense" 605. The "offense context" 607 includes still other nodes of relevance. There may also be a set of device activities 609 that include relevant device nodes 608. As depicted by the arrow 610, augmenting the context graph 600 using the knowledge graph 602 examines whether there is any path (such as one or more of paths 611, 613 or 615) from a node in the set of offense context nodes 607 to a node in the set of device activities 609 that passes through one or more nodes of the knowledge graph 602 (to which a threat activity is attached)? In the example shown, there is one or more such paths (611, 613 and 615), and the relevant subgraph 617 in the knowledge graph thus is captured and used to augment the offense context graph.

Thus, in the approach, details of an offense are extracted from a SIEM system, such as QRadar. The details typically include offense types, rules, categories, source and destination IP addresses, and user names. For example, an offense may be a malware category offense that indicates that malicious software is detected on a machine. Accordingly, activities of the machine around the offense need to be examined to determine infection vectors and potential data leakage. Of course, the nature of the activities that will need to be investigated will depend on the nature of the offense.

According to a further aspect of the approach, offense context related to an identified offense is then extracted and enriched depending on various factors, such as time, an offense type, and a direction. For example, if an offense type is a source IP, system and network activities of the same source IP (which may or may not be captured at other offenses) may then be collected. This collected context depicts potential casual relationships among events, and this information then provides a basis for investigation of provenance and consequences of an offense, e.g., Markov modeling to learn their dependencies. Of course, the nature of the offense context extraction and enrichment also depends on the nature of the offense.

From the contextual data extracted (as described above), an initial offense "context graph" 600 in FIG. 6 is built, preferably depending on offense types, such that a main offense source becomes a root 604 of an offense context graph, and offense details are then linked together around the root node. As noted above, the initial context graph preferably is then enriched and, in particular, by correlating local context, to further identify potential causal relationships among events. This helps analysts perform deep, more fine-grained investigation of provenance and consequences of the offense.

In this embodiment, provenance context preferably is extracted by identifying other offenses wherein the offense source is a target, e.g., an exploit target. Similarly, consequence context is extracted, preferably by finding other offenses wherein the offense source also is a source, e.g., a stepping stone. Similarly, consequence context is extracted by finding other offenses. Thus, this graph typically contains the offending entity (e.g., computer system, user, etc.) as the center (root) node of the graph, and contextual information is gradually connected to the node and its children. The result is the offense context 607 in FIG. 6. Examples of contextual information will depend on the nature of the offense; such information can be represented by activity nodes that include, without limitation, network activity, user activity, system activity, application activity, and so forth. Preferably, an activity comprises one or more observables, which are then connected to the respective activity nodes or directly to the center node. Further, the context graph can be extended with additional nodes representing information that does not directly relate to the original offense. For example, and by means of data mining (e.g., behavior-based anomaly detection, sequence mining, rule-based data extraction, and the like) of security-related events in temporal vicinity to the offense, additional activities of interest can be extracted and added to the context graph. This operation is represented in the graph by device activities 606.

Thus, in the approach as outlined so far, details of an offense are extracted from a SIEM system. The details include (but are not limited to) offense types, rules, categories, source and destination IPs, and user names. An initial offense context graph is built depending on offense types, such that the main offense source becomes the root of an offense context graph and offense details are linked together around the root node. The initial context graph is then enriched by correlating local context to further identify potential casual relationships among events, which helps analysts perform deep investigation of provenance and consequences of the offense. Provenance context is extracted by identifying other offenses where the offense source is a target, e.g., an exploit target. Similarly, consequence context is extracted by finding other offenses where the offense target is a source, e.g., a stepping stone. The enriched (and potentially dense) offense context graph is then pruned to highlight critical offense context for the SOC analyst's benefit. Typically, pruning is applied based on several metrics, such as weight, relevance, and time. For example, it may be desirable to assign weight to each event detail based on offense rules and categories to thereby indicate key features contributing to an offense.

Once the initial offense context graph is built, preferably that context graph is further enriched, validated and/or augmented based on information derived from a cybersecurity knowledge graph (KG) 602, which as noted above preferably is a source of domain knowledge. The knowledge graph, like the initial offense context graph, comprises nodes and edges. The cybersecurity knowledge graph can be constructed in several ways. In one embodiment, one or more domain experts build a KG manually. According to this disclosure, and as will be described below, preferably the KG 602 is built automatically or semi-automatically, e.g., from structured and unstructured data sources. As noted above, the context extraction and analysis processes provide a list of observables related to the given offense. According to this operation, the observables preferably are then enriched using the in-depth domain knowledge in the KG. This enrichment (or knowledge graph exploration) is now described.

In particular, this knowledge graph (KG) enrichment operation can be done in several different ways. In one approach, enrichment involves building sub-graphs related to the observables. To this end, the system locates the observables in the KG and discovers the connections among them. This discovery may yield one or more subgraphs (such as 617 in FIG. 6) showing the relationships of the given observables with other related security objects such as observables and threats. These subgraphs can provide a broader view on the given offense.

In another enrichment scenario, a SOC analyst can perform the query knowledge graph (KG) exploration step receives a set of observables, such as IP, URL, and files hashes, extracted from the SIEM offense. This exploration step seeks to identify all related and relevant pieces of information or entities available in the knowledge graph. The main goal is to find out how strongly the input observables are related to malicious entities in the knowledge graph. Some of the related entities can be strong malicious indicators, and thus a hypothesis about the offense can be generated. The related malicious entities might be strongly related among themselves, which also creates a hypothesis. Generalizing, an output of this step is a set of one or more hypotheses, which are consumed during the evidence-based threat hypothesis scoring operation where they are evaluated against local SIEM data. Preferably, and as noted above, the extraction of related entities is performed by traversing the knowledge graph, preferably starting from the input observables and extracting the subgraph. In general, unconstrained subgraph extraction may result in a very large and noise graph. Thus, preferably one or more traversal algorithms that focus on finding different types of related information by exploring the graph and pruning less relevant entities from the result may be deployed. One or more of these pruning algorithms may be run serially, in parallel, or otherwise. In addition, where possible coefficients of the graph entities are precomputed to enhance the efficiency of the graph traversal.

The following describes additional details of the evidence-based threat hypothesis scoring. Preferably, the knowledge graph exploration step returns a subgraph of observables, along with one or more annotations associated with the hypotheses. This subgraph preferably is then mapped into the original context graph. To reinforce the hypotheses, it may be desirable to build further relevant evidence, e.g., by querying local SIEM data for the presence of activities that are related to the hypotheses returned by the knowledge graph exploration. These activities may not have been flagged before by a simple rule-based offense monitor. This operation thus builds a merged graph that includes input from three sources, the original context graph, the knowledge graph exploration subgraph, and the additional observables queried for building the evidence for the hypotheses.

As also described, the final operation typically is offense investigation. Based on the prior operations described, the offense hypotheses now include the original offense IOCs, knowledge graph enrichment and supporting evidences, and their scores. This extended graph then is provided to an SOC analyst for an offense investigation. The SOC analyst reviews the weighted hypotheses and chooses the right hypothesis that explains the given offense. The selection itself may be automated, e.g., via machine learning. If further exploration and more evidence are needed to make a decision, the SOC can choose the nodes and/or edges of interest in the hypothesis graphs, and then repeat the above-described steps of knowledge graph exploration and evidence-based threat hypotheses scoring. During the hypothesis review process, the SOC may learn new facts and insights about the offense and, thus, add additional queries (e.g. observables or relationship) in a next iteration. The SOC analyst thus can use this iterative knowledge enrichment, evidence generation and hypothesis scoring to gain a deep understanding of the offense and actionable insights that may then be acted upon.

Thus, the basic notion of this approach is to use an autonomic mechanism to extract what is known about an offense (or attack), reason about the offense based on generalized knowledge (as represented by the knowledge graph), and thereby arrive at a most probable diagnosis about the offense and how to address it.

Feedback-Based Prioritized Cognitive Analysis

The technique described above with respect to FIGS. 4-6 assumes the existence of offense context graph, as well as a cybersecurity knowledge graph (KG). The remainder of this disclosure is directed to an interactive and automated technique to provide a more efficient and effective way to expand the offense context graph (or, more generally, a cybersecurity graph) and, in particular, by traversing the knowledge graph based on a notion of "tailored prioritization." As will be seen, this approach to prioritizing which nodes/edges of the knowledge graph should be traversed (e.g., to expand or enhance an offense context graph) preferably uses a combination of machine learning (ML) and security analyst domain knowledge in a unique way. As will be seen, preferably the machine learning is augmented in a feedback-based approach to provide a cybersecurity offense analytics system that in effect acquires (and can then leverage) the domain knowledge of one or more security analysts, e.g., as those analysts take actions with respect to security threats. That domain knowledge is encoded into a form useable by a machine learning (ML) system, and the ML system uses the encoded actions to weight the nodes and edges of a graph (e.g., the offense context graph, or, more generally, the knowledge graph itself).

The information flow, however, preferably is not merely one-way, namely, from the security analyst to the ML system. Thus, preferably the ML system also provides feedback to the security analysts themselves so that the analysts can better prioritize which paths to explore (e.g., given known node type and context). Thus, the technique herein provides a bi-directional "feedback-based" cognitive analysis that takes full advantage of both human and machine-driven knowledge sources. Thus, in one direction (from the security analyst to the ML system), the feedback (or, more generally, the input) is a set of security analyst domain knowledge that is encoded to facilitate the machine learning. In the other direction (from the ML system to the analyst), the feedback is in the form of information (e.g., investigation paths for the security analysts to follow) provided by the ML system. This information, for example, may be a set of initial weights that the security analyst should afford a particular node or edge and that is based on a confidence level of a set of data sources used to construct the knowledge graph. Further, weights learned from the interactive investigation (as encoded in the domain knowledge) can also be evaluated and adapted into the guided search.

Figure 7:
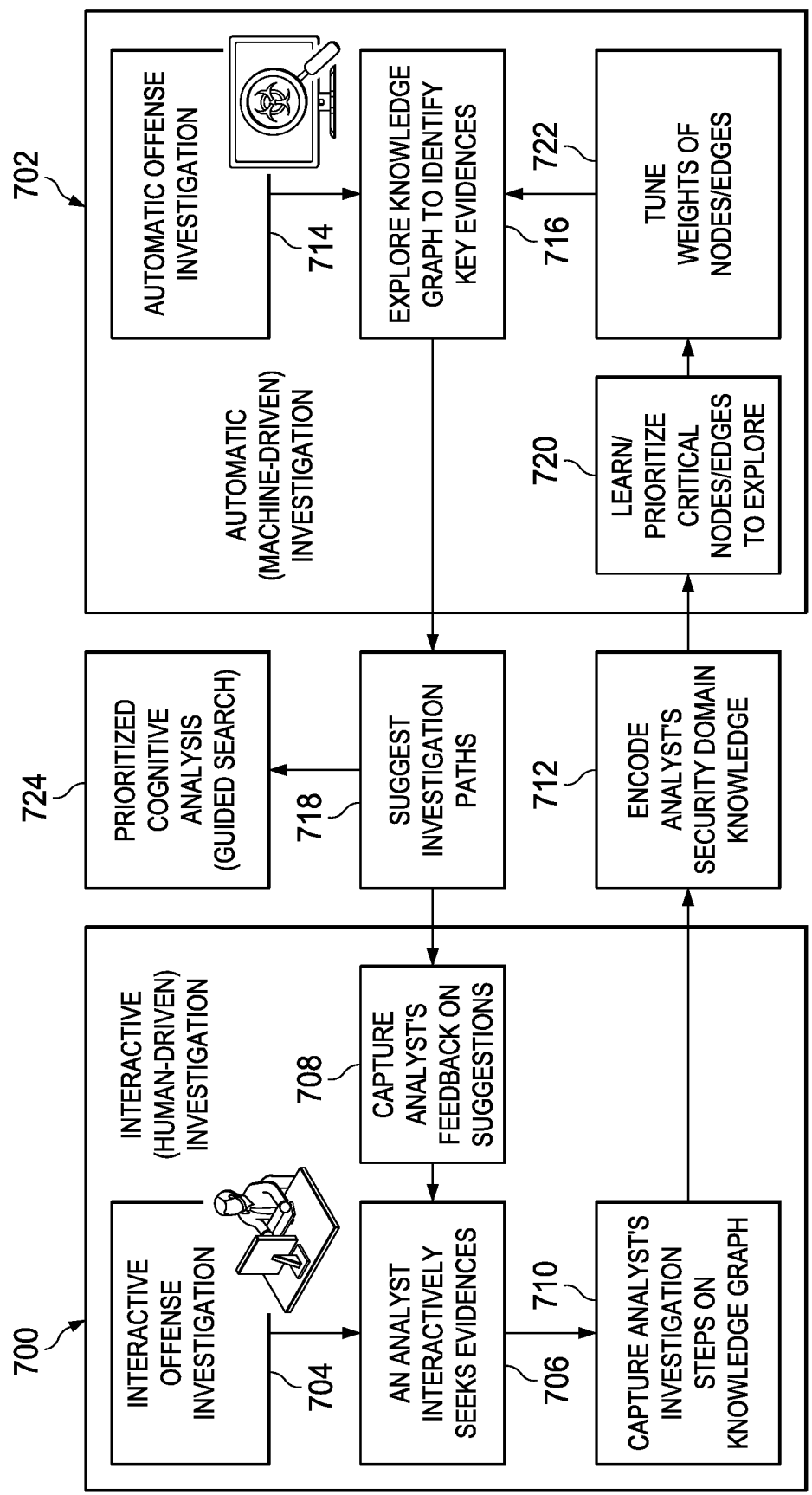
FIG. 7 depicts a process flow of feedback-based tailored knowledge graph traversal method and mechanism according to this disclosure.

This information flow preferably is a continuously-looping process as depicted in the process flow shown in FIG. 7, which is now described.

As depicted, the left side of the diagram illustrates a security analyst (human) side of the interaction, while the right side illustrates the machine learning (an automation) side. More formally, block 700 indicates an interactive (human-driven) investigation that is designed generally to encode into a domain knowledge model a security analyst's approach to investigating an offense, and to understand the analyst's methodology of how to expand the offense context graph. Block 702 depicts the automatic (machine-driven) investigation that explores the graph to identify relevant information (evidences) for the offense.

Referring now to block 700, during this investigation, the analyst's investigative steps (or, more generally, "actions") are captured to get a sense of which node/edge the security analyst thinks is valuable/critical to explore. Preferably, this capture occurs in an automated manner using a recording device or system that actively monitors, detects and saves the security analyst workflow. Thus, at step 704 the security analyst (only one is shown for simplicity) begins his or her interactive offense investigation. As noted above, this operation typically begins with the offense context graph that is generated in the manner previously described. At step 706, the security analyst seeks evidences in support of one or more observables in the graph and, as depicted, preferably this operation is informed at least in part from feedback from the machine learning side. In particular, and as will be described further below, here the machine learning operations have suggested a guided search comprising one or more investigation paths 718, and that feedback is captured at step 708 and provided to the security analyst as an input. As a result, the security analyst can take advantage of both his or her knowledge, as well as the intelligence gained or gleaned from the machine learning side. At step 710, the security analyst's investigative steps on the graph (and as such steps are influenced by the machine learning system feedback) are captured and encoded as a set of security analyst domain knowledge 712. The technique for encoding the security analyst workflow into a form useable by the machine learning will vary depending on implementation. Any tool that receives an input the workflow operations and then encodes them into a machine-useable form (e.g., XML) may be used for this purpose.

While only one security analyst is shown, in the usual case there are multiple security analysts. There may be a set of domain knowledge generated per security analyst, or a single set that aggregates the working domain knowledge from multiple security analysts. There may be a domain knowledge set 712 that is specific to a particular type of graph.

In this manner, a security analyst's domain knowledge is acquired and encoded for use by the remainder of the system.

Turning now to the machine learning side, and as noted above, block 702 indicates an automated (machine-driven) investigation that preferably is performed continuously. In this machine-driven investigation (that preferably is machine learning-based), the system provides automatic offense investigation 714. In particular, and at step 716, the system continuously performs a breadth-first search for exhaustive exploration of a graph to identify key (i.e., strong) malicious indications/evidences. Preferably, and as a result of executing step 716, an initial weighting scheme is generated, e.g., based on a confidence level of data sources that are used for the graph exploration. Thus, for example, the system 702 may determine to provide an initial set of weights to the nodes and/or edges, with the value(s) of those weights indicative of the relative relevance of the source data (e.g. reports from security vendors might be more highly valued as compared to reports from an arbitrary security blog). The weights typically also depend on one or other factors, e.g., time, time-of-day, location, or the like. The particular weighting scheme may be implemented according to a policy, and one or more templates may be used to facilitate a configuration of the automatic offense investigation functionality. Closeness-in-time may be particularly relevant, as it takes into consideration that IP-domain relationships often are time-sensitive. Other factors that may considered include aspects of the graph itself, such as the type tuple of the nodes (observable types) connected, and the type of the edge (relation type).

As also depicted, and just like interactive (human) side being augmented with the machine learning (at step 708), the system 702 explores the knowledge graph 716 influenced at least in part by the security analyst domain knowledge 712. To this end, the domain knowledge 712 is processed at step 720 by the machine learning system to prioritize the nodes and edges to explore. At step 722, the weights of given nodes or edges in the graph may be tuned as a result of the analyst's feedback (as expressed in the encoded domain knowledge).

As also depicted, the system 702 generates the guided search comprising the one or more investigate paths 718 for the graph. At step 724, the guided search 718 is then taken up as the prioritized cognitive analysis for the graph. This completes the processing.

Thus, the approach as depicted in FIG. 7 provides feedback-based investigation that combines both interactive and automatic investigation. The analysts' feedback (as expressed, for example, in the encoded domain knowledge) helps the learning system tune weighting and preferences of nodes, edges and graph traversal depths with respect to the automatic (machine-based) investigation. At the same time, automatic investigation suggests or recommends to the analysts which nodes or edges to investigate, e.g., guided search.

The feedback-based technique depicted in FIG. 7 is not limited merely to a cybersecurity knowledge graph but also may be used for any type of graph.

The technique described above has significant advantages. It provides an enhanced method and system for improving cybersecurity analysis by enabling the system to assign more relevant weights to nodes and edges so that these nodes/edges receive prioritized treatment during the cognitive analysis. By controlling how weights and their values are chosen, the system prioritizes which nodes/edges should be explored, thus significantly increasing the reliability of utility of the results. Indeed, by implementing the feedback-based prioritization scheme, the system can identify and rank observables related to an offense in a much more computationally- and storage-efficient manner. Traversing a knowledge graph based on tailored prioritization in this manner provides an efficient and effective way to enhance or expand an offense context graph. As a consequence, the overall performance of the network threat detection and mitigation systems that rely on the graph-based cognitive analysis approach are also increased.

More generally, the approach herein provides for an enhanced data mining process on security data (e.g., a cybersecurity incident) to extract contextual data related to the incident, and to translate this information into a graph representation for investigation by a security analyst. By leveraging the analyst's domain knowledge to enhance how the automated system recommends how to traverse the graph, and by using the automated system to help guide the analyst workflow, the approach greatly enhances the efficiency and reliability of the cognitive analysis system as a whole. The feedback-based prioritization technique of this disclosure provides a way to capture connections and consolidated intelligence among many IOCs, thereby facilitating improved security incident analytics and response.

The technique herein also provides for enhanced automated and intelligent investigation of a suspicious network offense so that corrective action may be taken. The nature of the corrective action is not an aspect of the described methodology, and any known or later-developed technologies and systems may be used for this purpose.

A further advantage is the dynamic nature of the continuous feedback mechanism that keeps the analysis up-to-date with respect to the continuously-changing security knowledge and the continuously-evolving interpretation of the security knowledge by the analyst.

As is well-known, machine learning involves the construction of algorithms that learn from data. Such algorithms operate by building a model based on inputs, and using that model to make predictions or decisions, rather than following only explicitly programmed instructions. One categorization of machine learning tasks arises by considering the desired output of a machine-learned system. In a classification approach, inputs are divided into two or more classes, and the learner must produce a model that assigns unseen inputs to one or more of these classes. A particular ML type is decision tree learning. This type of learning uses a decision tree as a predictive model, which maps observations about an item to conclusions about the item. In the approach herein, preferably the machine learning model (the classifier) is generated and refined as needed using known machine learning tools and methods. More generally, the particular machine learning algorithms used in the automatic offense investigation may be varied depending on implementation.

The operations (blocks 700 and 702) shown in FIG. 7 may be co-located, or these operations may be carried out in location that are remote from one another.

While the operations (blocks 700 and 702) shown in FIG. 7 are depicted and described as being performed in a continuous loop, this does not necessarily that all of the depicted operations are carried out concurrently. One or more operations may be performed as a pre-processing operation, or in an off-line manner, relative to some other operation. Generally, however, the bi-directional feedback nature of the interactions is preferred.

This subject matter may be implemented as-a-service. The subject matter may be implemented within or in association with a cloud deployment platform system or appliance, or in association with a Question-Answer based Natural Language Processing (NLP) system, products, device, program or process. The machine learning (ML) functionality may be provided as a standalone function, or it may leverage functionality from other ML-based products and services.

The automatic offense investigation (block 714) may take advantage of consolidated security and threat intelligence information from both structured and unstructured data sources. In particular, the cybersecurity knowledge graph (KG) may be formed by information that originates (or derived from) multiple structured and unstructured data sources. Structured data sources provide security and threat intelligence information about "what/who are bad," but typically such data sources lack in-depth knowledge about the threats, as well as actionable insights about how to address specific situations. Typically, structured data sources are carefully curated by domain experts. Examples include, without limitation, IBM X-Force Exchange, Virus Total, blacklists, Common Vulnerability Scoring System (CVSS) scores, and others. Unstructured data sources, in contrast, provide much more contextual information, such as why particular IP addresses or URLs are bad, what they do, how to protect users from known vulnerabilities, and the like. Examples of such unstructured data sources include, without limitation, threat reports from trusted sources, blogs, tweets, among others. Structured and unstructured knowledge thus exists separately, and even structured data sources are scattered and heterogeneous. Thus, the automated system 702 may include a technique to consolidate security and threat intelligence information obtained from both structured and unstructured data sources. The composite knowledge graph that results from this process may be tightly-consolidated, meaning that it includes all of the information derived from the structured data sources and the unstructured data sources, or the composite knowledge graph may be more loosely-consolidated, meaning that it has two distinct parts, a "structured" portion, and an "unstructured" portion.

In a typical use case, a SIEM or other security system has associated therewith a knowledge graph interface that can be used to render the knowledge graph (or portions thereof) visually, to search and retrieve relevant information from the graph, and to perform other known input and output functions with respect thereto. One such use of the consolidated knowledge graph is to facilitate the cognitive analysis described above with respect to FIGS. 4-6.

As noted above, the approach herein is designed to be implemented in an automated manner within or in association with a security system, such as a SIEM.

Processing of unstructured data sources as described herein may be facilitated using a question and answer (Q&A) system, such as a natural language processing (NLP)-based artificial intelligence (AI) learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers.

A representative Q&A system, such as described in U.S. Pat. No. 8,275,803, provides answers to questions based on any corpus of data. The method described there facilitates generating a number of candidate passages from the corpus that answer an input query, and finds the correct resulting answer by collecting supporting evidence from the multiple passages. By analyzing all retrieved passages and that passage's metadata in parallel, there is generated an output plurality of data structures including candidate answers based upon the analyzing step. Then, by each of a plurality of parallel operating modules, supporting passage retrieval operations are performed upon the set of candidate answers; for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers.

In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the knowledge graph generation and processing techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based knowledge graph-based analytics.

As noted, an initial or refined consolidated graph as described herein may be rendered for visual display, e.g., to a SOC analyst, to facilitate a follow-on security analysis or other security analytics use.

Having described the invention, what we claim is as follows:

1. A method for processing security event data in association with a cybersecurity knowledge graph having nodes and edges, comprising:
    receiving from a security system information representing an offense;
    building an offense context graph based in part on context data extracted about the offense;
    prioritizing for traversal given nodes and edges of the knowledge graph based on an encoding, the encoding being captured from a workflow; and
    refining the offense context graph by traversing the nodes and edges of the knowledge graph according to a prioritization tailored at least in part by the encoding.

2. The method as described in claim 1 wherein the workflow represents a set of domain knowledge captured from an interactive human-driven investigation of the offense context graph by a security analyst.

3. The method as described in claim 2 further including:
    identifying a set of knowledge graph investigation paths; and
    providing the security analyst, as a recommendation, the set of knowledge graph investigation paths.

4. The method as described in claim 3 wherein the workflow is further based at least in part on information received as a result of the security analyst investigating the set of knowledge graph investigation paths.

5. The method as described in claim 1 wherein the given nodes and edges of the knowledge graph are prioritized for traversal using machine learning.

6. The method as described in claim 5 wherein the prioritization of the nodes and edges in the knowledge graph are represented by a set of weights.

7. The method as described in claim 1 wherein the encoding is continuously updated.

8. An apparatus for processing security event data in association with a cybersecurity knowledge graph having nodes and edges, comprising:
    a processor;
    computer memory holding computer program instructions executed by the processor, the computer program instructions operative to:
        receive from a security system information representing an offense;
        build an offense context graph based in part on context data extracted about the offense;
        prioritize for traversal given nodes and edges of the knowledge graph based on an encoding, the encoding being captured from a workflow; and
        refine the offense context graph by traversing the nodes and edges of the knowledge graph according to a prioritization tailored at least in part by the encoding.

9. The apparatus as described in claim 8 wherein the workflow represents a set of domain knowledge captured from an interactive human-driven investigation of the offense context graph a security analyst.

10. The apparatus as described in claim 9 wherein the computer program instructions are further operative to:
    identify a set of knowledge graph investigation paths; and
    provide the security analyst, as a recommendation, the set of knowledge graph investigation paths.

11. The apparatus as described in claim 10 wherein the workflow is further based at least in part on information received as a result of the security analyst investigating the set of knowledge graph investigation paths.

12. The apparatus as described in claim 8 wherein the computer program instructions to prioritize given nodes and edges of the knowledge graph implement a machine learning algorithm.

13. The apparatus as described in claim 12 wherein the prioritization of the nodes and edges in the knowledge graph is represented by a set of weights.

14. The apparatus as described in claim 8 wherein the computer program instructions continuously update the encoding.

15. A computer program product in a non-transitory computer readable medium for use in a data processing system for processing security event data in association with a cybersecurity knowledge graph having nodes and edges, the computer program product holding computer program instructions that, when executed by the data processing system, are operative to:
    receive from a security system information representing an offense;
    build an offense context graph based in part on context data extracted about the offense;
    prioritize for traversal given nodes and edges of the knowledge graph based on an encoding, the encoding being captured from a workflow; and
    refine the offense context graph by traversing the nodes and edges of the knowledge graph according to a prioritization tailored at least in part by the encoding.

16. The computer program product as described in claim 15 wherein the workflow represents a set of domain knowledge captured from an interactive human-driven investigation of the offense context graph a security analyst.

17. The computer program product as described in claim 16 wherein the computer program instructions are further operative to:
    identify a set of knowledge graph investigation paths; and
    provide the security analyst, as a recommendation, the set of knowledge graph investigation paths.

18. The computer program product as described in claim 17 wherein the workflow is further based at least in part on information received as a result of the security analyst investigating the set of knowledge graph investigation paths.

19. The computer program product as described in claim 15 wherein the computer program instructions to prioritize given nodes and edges of the knowledge graph implement a machine learning algorithm.

20. The computer program product as described in claim 19 wherein the prioritization of the nodes and edges in the knowledge graph is represented by a set of weights.

21. The computer program product as described in claim 15 wherein the computer program instructions continuously update the encoding.

22. A cybersecurity analytics platform, comprising:
one or more hardware processors;
a data store holding a knowledge graph representing cybersecurity threat intelligence knowledge; and
computer memory storing computer program instructions configured at least in part to:
capture sets of actions of one or more security analysts as respective threats to a computer network are analyzed by the one or more security analyst;
encode the sets of actions into one more sets of machine-readable domain knowledge;
use the encoded actions to weight, based at least in part on machine learning, respective nodes and edges of the knowledge graph;
generate, based on an automated analysis of an offense context graph, a set of knowledge graph investigation paths; and
provide to the one or more security analysts the set of knowledge graph investigation paths, the set of knowledge graph investigative paths informing at least one set of actions captured; and
augmenting the offense context graph based at least in part on information received by traversing the knowledge graph according to the weight.

\* \* \* \* \*